July 7, 1953   R. S. GRIMSHAW   2,644,721
VEHICLE WHEEL ORNAMENTAL TRIM RING CONSTRUCTION
Filed Jan. 19, 1949
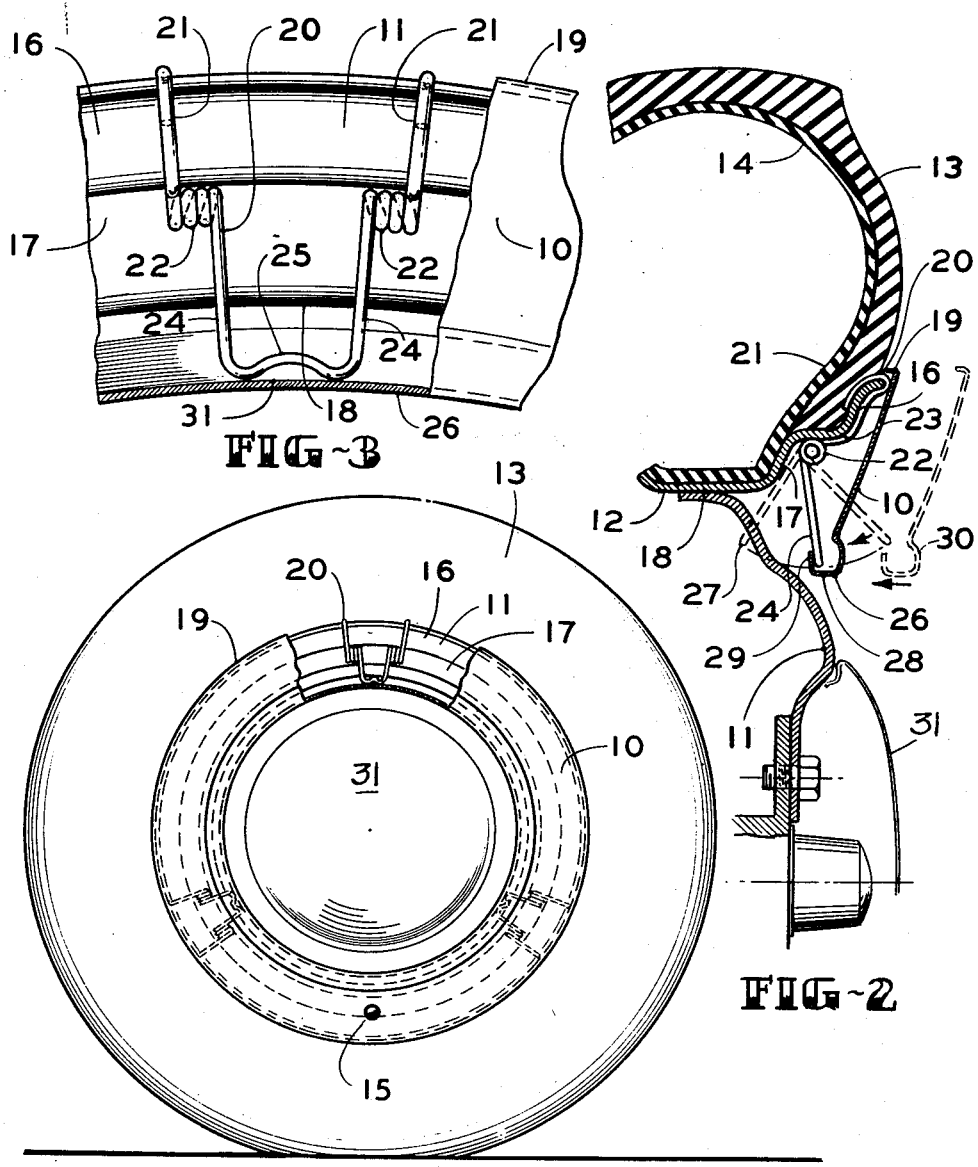
INVENTOR
Robert S. Grimshaw Patented July 7, 1953

2,644,721

UNITED STATES PATENT OFFICE 2,644,721

VEHICLE WHEEL ORNAMENTAL TRIM RING CONSTRUCTION

Robert S. Grimshaw, Detroit, Mich.

Application January 19, 1949, Serial No. 71,601

5 Claims. (Cl. 301—37)

This invention relates generally to vehicle wheel ornamental trim rings, and in particular to a method or the like of attachment.

The rod wheel of a vehicle is a part which has received little improvement or beautification in proportion to the progress in vehicle styling. The application of an ornamental wheel trim ring to a vehicle greatly enhances the overall eye appeal of said vehicle and adds greatly to the trim appearance. Said trim ring is considered herein as an annular portion extending from the outer flange of the tire rim toward the center of the wheel and terminating in a periphery of suitable relationship to the vehicle wheel hub cap. The trim ring may be of any suitable material such as, plastic, steel, aluminum, and of any design or color possible within the scope and purpose of the invention described herein. Most of the devices in the art, up to the present, have had several inherent defects, principally in regard to the methods of attachment of the ornamental trim ring to the vehicle wheel. Practical experience has proven that it is necessary to have the trim ring removably attached to the road wheel so that damage to the trim ring may be avoided in the rough handling encountered in the course of tire changing.

Some tire trim rings are attached to the vehicle wheel by means of small tabs or projections which dig into the paint finish of said wheel, the thickness of the paint being the only retaining medium. When ornamental trim rings so attached are removed for any purpose, the paint on the wheel surface is scraped off. Inasmuch as the location of the valve stem in relation to the trim ring and the wheel is always the same, the paint is removed in exactly the previous mounting location. Thus the paint thickness is removed at the mounting tab locations allowing the trim rings to come loose and become lost. Other types are held on by the wheel hub cap of the vehicle in which case a plurality of models or die forms are required due to the variety of wheel contours in the industry. With this later method of attachment many hub caps are lost as well as wheel trim rings due to the additional strain on the hub cap attaching clips for which they were not designed. Some forms of attachment interfere with the commonly used wheel balance weights which are attached to the wheel tire rim outer flange. Any form of trim ring which comes loose in operation of the vehicle becomes a hazard both to highway traffic as well as pedestrains nearby as a rolling trim ring can strike with a terrific force. Poor attachment also causes a loss to the owner of his investment in such a device.

The improvement to be described herewith and pertaining to ornamental wheel trim ring mounting, is based on the fact that the outer tire rim flange in section is standard on all motor car wheels of a given tire inside diameter. In the case of motor car production, practically all wheels are either fifteen inch or sixteen inch diameter. Thus the invention of this description greatly improves the practicability and service of the use of ornamental wheel trim rings. A complete description follows.

One object of this invention is to provide a means of removably attaching an ornamental trim ring to a vehicle wheel by means of spring clips locked over the edge of the tire rim at intervals therearound, said clips also holding trim ring to a vehicle by means of a channel section portion of said trim ring. Thus the trim ring is securely attached to a vehicle wheel in a simple positive manner and may be removed for tire changing, or brake adjustment or the like without the use of any special tools. It is obvious that the shape of the ornamental wheel trim ring may embrace a number of various design sections or materials all of which may still be dependent upon the purpose and scope of this combination of clip and channel section as described herewith.

Another object is to provide an ornamental wheel trim ring and the attachment means thereof, wherein said ornamental wheel trim ring is provided to fit over the outer flange of the wheel tire rim so that only one model trim ring is required for a given standard wheel size. This construction requires a minimum of trim ring sizes to be carried in stock by a dealer.

Another object is to provide an ornamental wheel trim ring and the attachment means thereof wherein said attaching clips lock the trim ring to the outer flange of the tire rim and independent of any other part of the wheel, such as the hub cap. In the case of some trim rings of prior art and held on to the wheel by means of the hub cap flange, the additional strain on the hub cap attaching spring clips was sometimes great enough to cause the hub cap to disengage from the wheel, resulting in a loss to the owner of both the hub cap and trim ring. The invention described herewith eliminates this hazard.

Another object is to provide an ornamental wheel trim ring and the attaching means thereof, wherein said spring clip attaching means is flexible enough in action to allow a slight outward deflection of the trim ring away from the tire rim, as in the case of a flat tire, and yet positive enough in attachment that the trim ring will not become disengaged and lost under such or similar conditions.

Another object is to provide an ornamental wheel trim ring and the attachment means thereof, wherein said attaching means is completely hidden from exterior view by the trim ring proper. Said trim ring to flange over and cover the outer diameter of the attaching clips.

Another object is to provide an ornamental wheel trim ring and the attachment means thereof, wherein said trim ring may be removed or replaced an infinite number of times and still be attached to said vehicle wheel in a secure and positive manner after each attachment. In the case of some trim rings of prior art dependent upon projection tabs which dig into the thin layer of paint on the inner periphery of the tire rim, many become lost due to the fact that the paint is scraped off on the first removal thus removing the future means of attachment. With the invention described herein, the trim ring is provided with an easy as well as positive attachment and operative an unlimited number of times.

Another object is to provide an ornamental wheel trim ring and the attachment means thereof, wherein said attaching means may be located on the wheel tire rim flange at an infinite number of locations on the periphery of said tire rim flange thus avoiding any interference with the commonly used tire rim balance weights which are likewise located on the tire rim flange and used to balance the tire for proper roadability.

Another object is to provide an ornamental wheel trim ring and the attachment means thereof, wherein said trim ring is under constant and positive pressure against the outer periphery of the tire rim outer flange due to the pressure exerted by the attaching spring clips in a direction vertical to the surface of the wheel and against the inner flange of the circular channel section of the ornamental trim ring, said combination of spring clip and channel insuring a positive attachment free from rattles.

Another object is to provide an ornamental wheel trim ring and the attachment means thereof, wherein a circular line tangent to the inward and axial projection of the ends of the attaching clips is equally distant from the axis of the wheel, thus accurately locating the trim ring concentrically to the center of the wheel, thus assuring said ornamental wheel trim ring to rotate true.

Another object is to provide an ornamental wheel trim ring and the attachment means thereof, wherein said ornamental trim ring on its inner periphery is so shaped as to allow a clearance between the inner periphery of the trim ring and the actual outer surface of the wheel and likewise the hub cap. This clearance allows for the wheel color, as furnished by the manufacturer, to show thru between the inner periphery of the trim ring and the outer diameter of the hub cap thus accentuating the overall appearance of the entire assembly with color. In a like manner this clearance between the wheel trim ring inner periphery and the outer surface of the wheel allows for a free circulation of air between same to allow for proper heat dissipation away from the wheel brake drum as advised by the car manufacturers. In some solid cover plastic ornamental wheel trim rings now on the market, this heat is trapped between the wheel and wheel trim ring causing an undue deterioration of the plastic material. This defect is overcome in the invention as described herewith.

Other objects and advantages of my invention will become apparent during the course of the following description. It is obvious that a variety in design appearance and contour as well as material may be used and still come under the scope of this invention.

*Description of drawings*

Figure 1 is a side elevation showing an ornamental wheel trim ring of this invention, mounted on a vehicle wheel and having a fragmentary portion removed to better illustrate a typical mounting of one of the attaching clips on a tire rim flange.

Figure 2 is an enlarged vertical section thru a vehicle wheel having an ornamental wheel trim ring attached thereto and as described herewith.

Figure 3 is a further enlarged side view of the fragmentary portion of Figure 1 showing more complete detail of one of the attaching clips.

Referring to the drawings in detail, Figure 1 a side elevation and Figure 2 an enlarged vertical section show a preferred application of my invention wherein an ornamental wheel trim ring generally designated 10, is attached to a standard wheel assembly generally designated 11. The latter, Figure 2, consists of a drop center tire rim 12 having a standard tire 13 mounted thereon and containing a standard inflatable inner tube 14 and inflated by the means of a standard valve stem 15. Figure 1, projecting thru the trim ring outer surface as shown so as to be accessible for tire inflation. The standard tire 13 thus described is mounted upon aforesaid conventional tire rim 12 which is provided with a side or outer flange 16 and an intermediate flange 17 and being joined at the wheel main body outer periphery with a base section 18. Tire rim section 18 is permanently mounted on the wheel main body 11 which in turn is rotatably mounted upon a conventional axle (not shown) and is standard practice. The junction of said wheel portion and the axle is covered from view by a removably attached hub cap 31.

Referring again to Figure 2; mounted upon and at disposed intervals around the outer lip of tire rim flange 16 are spring clips 20. Said clip is of spring wire or other suitable material having the two open ends 21 projecting over and inward and embracing the outer tire rim flange 16. The outward portions of clip 20 continues from the outer lip of flange 16 of the tire rim in a radial direction toward the axis of the wheel and thence inwardly embracing and following the contour section of the outer flange 16 and terminating on the inner periphery of the intermediate flange in a coil spring tension portion 22. Thus spring attaching clip 20 is securely locked to the outer flange of the tire rim 16 due to the over stressing of the spring end portions 21 as coil section 22 snaps over tire rim intersection 23. The inward ends 24 of the clip 20, Figures 2 and 3, protrude from the coil section 22 radially toward the axis of the wheel and join in a flat or otherwise shaped portion as at 25. Figure 3, and which is radially equally distant from the wheel axis with any or all other clips likewise located on said rim. Figure 3 shows an enlarged view of clip 20 as described.

Referring again to Figure 2, ornamental trim ring 10 has located on its outer circumference a small flange 19 turned inwardly to the face of the wheel and projecting toward the surface of the tire 13 and of sufficient diameter to cover from exterior view, the attaching clips 20. Said trim ring, on inner periphery, is provided with a channel section 26 formed by bending the inner circumference section inwardly toward the wheel as at 28 and thence outwardly from the axis of the wheel as at 29, said inner flange 28 thus forming a diameter very slightly smaller than the one formed by a radius tangent to the inward portion of the attaching clips 25. Said inner flange in relation to attaching clips and slight clearance mentioned, is indicated by 31 in Figure 3. The channel section thus described may also be considered as a separate rolled or otherwise formed portion attached to the main body of the ornamental wheel trim ring in any standard method and still come within the scope of this invention, provided that the intent and purpose of the attachment means is evident as described herewith. Thus the trim ring is concentrically located on the wheel at three or more points.

The channel section as just described also provides a locking means for attaching the trim ring to the vehicle wheel 11 and in conjunction with the inward projecting portions 25 of spring clip 20 and as shown in Figure 2. Inner portion of clips 20 as shown at 24 and 25 Figure 3 are shown in Figure 2 at 27 indicating assumed position of same when ornamental wheel trim ring is not attached. Said inner clamp portions 24 and 25 are so formed that when ornamental wheel trim ring is not attached to the wheel, said clamp portions provide a very positive tension against the wheel body proper and as indicated by arrow. Thus when the aforesaid clamp portion 24 and 25 is pulled away from the wheel by hand, the coil spring intermediate section 22 becomes overstressed, resulting in a vigorous and positive tension in the direction of the arrow and in a direction nearly perpendicular to the face of the wheel. Also in a like manner, when the ornamental wheel trim ring is attached to the wheel, a very positive clamping action the result of clamp portions 24 and 25 against the inner face of flange 29 locking trim ring assembly 10 to the vehicle wheel at three or more positions as may be required.

To attach an ornamental wheel trim ring assembly as heretofore described to a vehicle wheel having a standard drop center tire rim and equipped with an inflatable tire with a main valve stem the procedure is as follows. Jack vehicle wheel up from the ground in the ordinary manner and release air pressure from the tube. Next push tire casing 13 away from outer tire rim retaining flange 16. Three or more of the spring clips 20 are then located at equal or otherwise disposed intervals and also to avoid any tire balance weights, on the outer lip of tire flange 16 until coil spring tension portion 22 passes over the rim intersection point 23 and in a direction toward the outer face of the wheel assembly thus securely locking spring clips at said intervals to the outer flange 16. Tension of spring clip 20 shall be such that it will be found necessary to use force to start the open portion 21 over the outer lip of flange 16. A sharp blow at the bent over portion of end 21 will force the clip on to the tire rim until tension spring portion 22 has passed over the tire rim intersection point 23 thus locking the clip to the tire rim in a simple and positive manner. The inner tube is then reinflated and the clips are on the rim for the life of the vehicle. Clips so installed in no way interfere with the operation of the vehicle or the changing of tires. Stealing the clips from the rim is almost impossible and inasmuch as the trim rings can not be attached without the clips, stealing the ornamental wheel trim rings is greatly decreased over some types now marketed which are only held on by the wheel hub cap.

To attach ornamental wheel trim rings to a vehicle wheel equipped with spring clips 20 and as described herewith, trim ring is first located in relation to wheel assembly so that the valve stem 15 is in line with the tire valve opening in the trim ring proper. The end tabs 25 of the spring clips 20 which are nearest to the valve stem location are next inserted into the channel section 26 of the ornamental trim ring 10. That portion of the trim ring directly opposite to the valve stem 15 is free from the wheel and by pulling said edge in a direction away from the wheel as shown at 30, Figure 2, and in dotted outline, sufficient clearance is provided so that the inward tab portion of clips 20 may be inserted in a like manner in channel 26 of the ornamental wheel trim ring. Thus when said outer portion of trim ring is released all the tabs 25 of clips 20 so located in channel 26 provide a vigorous clamping action against the exterior tire rim flange 16 at small flange 19 due to the tension exerted by the aforesaid tabs 25 in a direction to the exterior surface of the wheel and the inward wall of the channel 26. Small flange covers the attaching clips and the ornamental wheel trim ring 10 is attached to the vehicle wheel, removably, and in a simple positive manner. To remove the ornamental wheel trim ring, the operation as described above is reversed.

What I claim is:

1. An ornamental wheel trim ring attaching means and trim ring assembly for removable attachment to an automobile wheel having a tire rim, an inflatable tire and a hub cap, said attaching means consisting of a plurality of one piece spring wire clips embracing the outward tire rim flange and inward configurations at spaced intervals therearound and having a portion projecting inwardly and toward the axis of said wheel, the inward projecting portion engaging with and removably locking the ornamental trim ring to the wheel.

2. An ornamental wheel trim ring attaching means and trim ring assembly for removable attachment to an automobile wheel having a tire rim, an inflatable tire and hub cap, said attaching means consisting of a plurality of one piece spring wire clips embracing the outward tire rim flange and inward configurations at spaced intervals therearound, said ornamental trim ring being larger in outer diameter than the outer diameter of the spring clips as attacched to said automobile wheel.

3. An ornamental wheel trim ring attaching means and trim ring assembly for removable attachment to an automobile wheel having a tire rim, an inflatable tire and hub cap, said attaching means consisting of a plurality of one piece spring wire clips embracing the outward tire rim flange and inward configuration at spaced intervals therearound, said ornamental wheel trim ring having its inward periphery turned at a right angle with its outward face and toward the vehicle wheel and thence to a second right angle and projecting away from the axis of the wheel, said spring clip being held in positive engagement against the inward wall of the channel so formed.

4. An ornamental wheel trim ring attaching means and trim ring assembly for removable attachment to an automobile wheel having a tire rim, an inflatable tire and a hub cap, said attaching means consisting of a plurality of one piece spring wire clips embracing the outward tire rim flange and inward configurations at spaced intervals therearound, said ornamental wheel trim ring having its inward periphery turned at a right angle with its outward face and toward the vehicle wheel and thence to a second right angle and projecting away from the axis of the wheel forming an outward projecting channel with open section away from the axis of the wheel, said channel section being spaced from the wheel and hub cap, the inward projecting portions of the clips locking against the inward wall of the channel whilst the outer rim of the trim ring is in rigid contact against the tire rim and attaching clips.

5. An ornamental wheel trim ring attaching means and trim ring assembly for removable attachment to an automobile having tire rim and an inflatable tire and hub cap, said attaching means consisting of a plurality of one piece spring wire clips, said clips having two ends to embrace and conform to the contour of the corrugated outer edge of the tire rim at two places for each clip, aforesaid mentioned portions to extend inward toward the axis of the wheel and thence under the intermediate inner periphery of the tire rim to an intermediate section formed of two loop or spiral wound torsion springs, and thence projecting further inward toward the axis of the wheel and joining together at right angles and toward each other to form an inward projecting portion engageable with aforesaid mentioned ornamental wheel trim ring assembly; said trim ring having on its inner periphery a channel section formed by bending the metal inward toward the center of the vehicle and thence outwardly, said channel section having its open portion away from the axis of the wheel and engageable with previously mentioned spring inward projecting portions, said clips having a torsional or clamping action against the inner wall of the trim ring channel section and locking same positively to vehicle wheel.

ROBERT S. GRIMSHAW.

References Cited in the file of this patent

UNITED STATES PATENTS

| Number | Name | Date |
|---|---|---|
| 1,972,216 | Dowty | Sept. 4, 1934 |
| 2,351,655 | Aske | June 20, 1944 |
| 2,386,241 | Lyon | Oct. 9, 1945 |
| 2,455,151 | Wood | Nov. 30, 1948 |